United States Patent
Conover

(10) Patent No.: US 6,169,581 B1
(45) Date of Patent: Jan. 2, 2001

(54) PHASE-LOCKED SYNC STRIPPER

(75) Inventor: Kurt M. Conover, Albuquerque, NM (US)

(73) Assignee: Honeywell Inc., Morristown, NJ (US)

( * ) Notice: Under 35 U.S.C. 154(b), the term of this patent shall be extended for 0 days.

(21) Appl. No.: 08/221,959

(22) Filed: Apr. 1, 1994

(51) Int. Cl.$^7$ ...................................................... H04N 3/24
(52) U.S. Cl. ............................................ 348/525; 348/637
(58) Field of Search .................................... 348/633, 501, 348/634, 636, 637, 536, 540, 525, 532, 521–524; H04N 3/24, 5/04, 5/05, 5/06

(56) References Cited

U.S. PATENT DOCUMENTS

| | | | |
|---|---|---|---|
| 3,005,869 | * 10/1961 | Dolby ..................................... | 348/501 |
| 3,681,522 | * 8/1972 | Tanabe ................................... | 348/501 |
| 3,813,488 | * 5/1974 | Cavett et al. .......................... | 348/525 |
| 4,379,309 | 4/1983 | Berke et al. ........................... | 358/154 |
| 4,464,679 | 8/1984 | Wargo .................................... | 358/148 |
| 4,535,357 | 8/1985 | Penney ................................... | 358/150 |
| 4,628,361 | 12/1986 | Andreas ................................. | 358/153 |
| 4,709,268 | 11/1987 | Akimoto et al. ...................... | 358/150 |
| 5,140,422 | 8/1992 | Constable .............................. | 358/153 |
| 5,189,515 | 2/1993 | Chen ..................................... | 358/157 |

FOREIGN PATENT DOCUMENTS

| | | | | |
|---|---|---|---|---|
| 0219273 | * | 9/1988 | (JP) .............................. | H04N 3/240 |
| 0192971 | * | 7/1992 | (JP) .............................. | H04N 3/240 |

* cited by examiner

*Primary Examiner*—David E. Harvey
(74) *Attorney, Agent, or Firm*—Loria B. Yeadon; Andrew A. Abeyta

(57) ABSTRACT

A method and circuit to strip the composite synchronization (sync) from a composite video signal is disclosed. This invention utilizes a phase-locked loop and a switchable input operational amplifier to remove the sync portion of the video signal without bandlimiting or introducing non-linearities to the video signal. The phase-locked loop creates a high frequency clock from which a signal can be created that fully encompasses the sync portion of the composite video signal. This signal controls the switchable input operational amplifier to select blank level voltage during sync or allow the video to pass when sync is not present.

2 Claims, 3 Drawing Sheets

PHASE-LOCKED SYNC STRIPPER

GOVERNMENT RIGHTS

The U.S. Government has a paid-up license in this invention and the right in limited circumstances to require the patent owner to license others on reasonable terms as provided for by the terms of Contract No. F33657-89-C-0009 awarded by the Department of the Air Force.

BACKGROUND OF THE INVENTION

1. Field of the Invention

The invention relates to video signal processing and more particularly to a method and apparatus for stripping synchronization information from a composite video signal.

2. Background Art

A composite video signal contains synchronization (sync) information encoded on it. A display processor uses sync to create a phased lock pixel clock. This allows the display processor to generate synthetic symbols. The sync format may be any one of several different compositions, however, in many circumstances the output sync format must not change regardless of the input format. To accomplish this desired output, the display processor must strip sync off without affecting the rest of the video signal.

Most prior art sync strippers generally comprise up to four matched diodes or transistors which require the video to be properly dc biased. Circuits of this type generally have associated high impedances which require buffering into and out of the circuit. The prior art devices are also temperature sensitive, which require complex temperature compensating networks.

U.S. Pat. No. 5,140,422 to Constable is a prior art solution to removing sync from the composite video signal. There are several problems with the Constable implementation. The National Television Standards Committee (NTSC) (composite) video signal must be delayed with respect to the N_SYNC signal which is created by the NTSC video. A delay circuit is damaging to the quality of the video. Delay circuits have low pass filter characteristics; that is, they are band limiting so high frequency components, such as edges and lines, etc., will become fuzzy or disappear completely. Delay circuits also add in noise and generally are not usable over temperature extremes.

Furthermore, Constable as disclosed will not work. The control signal N_SYNC preferably goes high slightly after the video sync interval has ended. Therefore, the signal must be delayed with respect to itself then the signal must be made to last longer. The delay circuit is disclosed but Constable fails to teach how the signal can be made to last longer.

U.S. Pat. No. 4,379,309 to Berke et al. describes the matched diode or transistor embodiment as described above. The circuit is a very complex non-linear circuit that is not stable over temperature, or production lots of transistors or diodes. This circuit is an amplitude limiter which has all the problems of an amplitude system, which include temperature compensation, non-linearity and parasitic problems.

U.S. Pat. No. 4,464,679 to Wargo describes using a phase-locked loop (PLL) and composite sync to hook up to a microprocessor interface for a video system. Wargo teaches detecting sync and does not disclose sync stripping.

U.S. Pat. No. 5,189,515 to Chen describes the use of a PLL to eliminate equalization pulses and noise from the composite sync signal after the sync signal has been detected. Chen discloses a PLL to generate horizontal and vertical sync signals using digital techniques by separating the horizontal and vertical signals from the composite sync signals. Chen does not teach using the PLL to strip the composite sync signal off the composite video signal.

Delay lines are used in the prior art to make the current pulse width completely blank the composite sync. A signal of any width occurring anywhere with respect to the sync is disclosed by using a PLL. As a result of using the PLL instead of delay lines, a much higher quality, high bandwidth video can be processed. Additionally, contrary to the prior art devices, the present invention is temperature independent.

SUMMARY OF THE INVENTION

In accordance with the present invention there is provided an apparatus and method for stripping the synchronization (sync) component from a composite video signal. The preferred circuit for stripping a sync component from a composite video signal comprises a phase-locked loop (PLL) for creating a high frequency clock, phase-locked with a video sync signal, and for generating a signal that encompasses the video sync signal, and an analog switch controlled by the signal that encompasses the video sync signal for stripping the video sync signal from the composite video signal.

The preferred PLL comprises a circuit for determining a leading edge of the video sync signal. An alternative embodiment of the PLL comprises a circuit for determining a trailing edge of the video sync signal.

The preferred signal that encompasses the video sync signal comprises a circuit for starting the signal at a first time period prior to the video sync signal and ending the signal at a second time period after the video sync signal. The preferred embodiment comprises a circuit for making the time periods selectable. The preferred time periods are longer than an activation time for the analog switch.

The signal that encompasses the video sync signal further comprises an analog switch activation time. The preferred time periods are also longer than $$\frac{1}{\text{frequency}}$$

of the high frequency clock.

The preferred analog switch comprises a switchable input operational amplifier. The analog switch can also comprise an analog multiplier.

The preferred analog switch comprises a circuit for switching a blank level voltage onto the composite video signal. The analog switch alternatively comprises a circuit for stripping horizontal sync. The analog switch can also comprise a circuit for stripping vertical sync.

The preferred circuit for stripping a synchronization component from a composite video signal comprises a phase-locked loop comprising a 10 MHz clock phase-locked with a leading edge of a video sync signal, and a signal that encompasses the video sync signal comprising a circuit for starting the signal, 1 clock oscillation before a leading edge of the video sync and ending at approximately 50 clock oscillations thereafter, and an analog switch comprising a switchable input operational amplifier controlled by the signal, for switching a blank level voltage onto the composite video signal.

The preferred method of stripping a synchronization component from a composite video signal comprises the steps of creating a high frequency clock, phase-locked with a video sync signal and for generating a signal that encompasses the video sync signal, controlling the signal that encompasses the video sync signal with an analog switch, and stripping the video sync signal from the composite video signal with the analog switch.

The preferred step of creating comprises determining a leading edge of the video sync signal. The alternative step of creating comprises determining a trailing edge of the video sync signal.

The preferred step of generating comprises starting the signal that encompasses the video sync signal at a first time period prior to the video sync signal and ending the signal that encompasses the video sync signal at a second time period after the video sync signal. An alternative embodiment comprises selecting the time periods.

The preferred step of generating a signal that encompasses the video sync signal comprises selecting time periods that are longer than a time for the analog switch to activate. The preferred step of generating a signal that encompasses the video sync signal further comprises determining an analog switch activation time.

The preferred step of selecting time periods comprises providing a time period longer than $$\frac{1}{\text{frequency}}$$

of the high frequency clock.

The preferred step of providing an analog switch comprises providing a switchable input operational amplifier. The alternative step of providing an analog switch comprises providing an analog multiplier. The preferred step of providing an analog switch comprises switching a blank level voltage onto the composite video signal. The alternative step of providing an analog switch comprises stripping horizontal sync. Another alternative step of providing an analog switch comprises stripping vertical sync.

A primary object of the present invention is to provide a sync stripper without matched diodes or transistors.

Another object of the present invention is to strip a sync signal from a composite video signal regardless of its composition.

A primary advantage of the present invention is that it does not require dc biasing.

Another advantage of the present invention is that it is not temperature sensitive.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Figure 2:
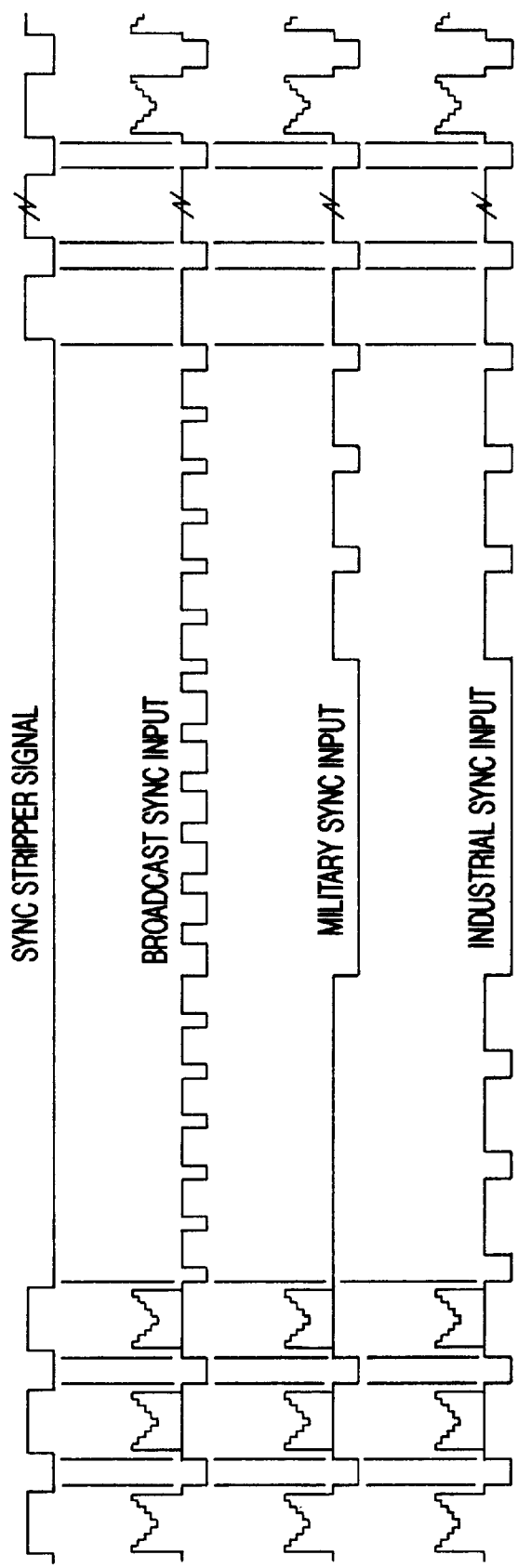
FIG. 2 illustrates three different composite video signals and the sync stripper signal prior to implementation.

The video sync stripper apparatus and method of the present invention comprise hardware components to strip a sync signal from a composite video signal without dc biasing the video signal and containing reduced temperature sensitivity. As indicated in FIG. 2, the sync component of various types of video signals such as those utilized in the broadcast industry, military applications and industrial applications, can be stripped with this invention. This invention is useful in a variety of applications such as television video systems, synthetic video applications or other video applications requiring removal of a video sync component.

Figure 1:
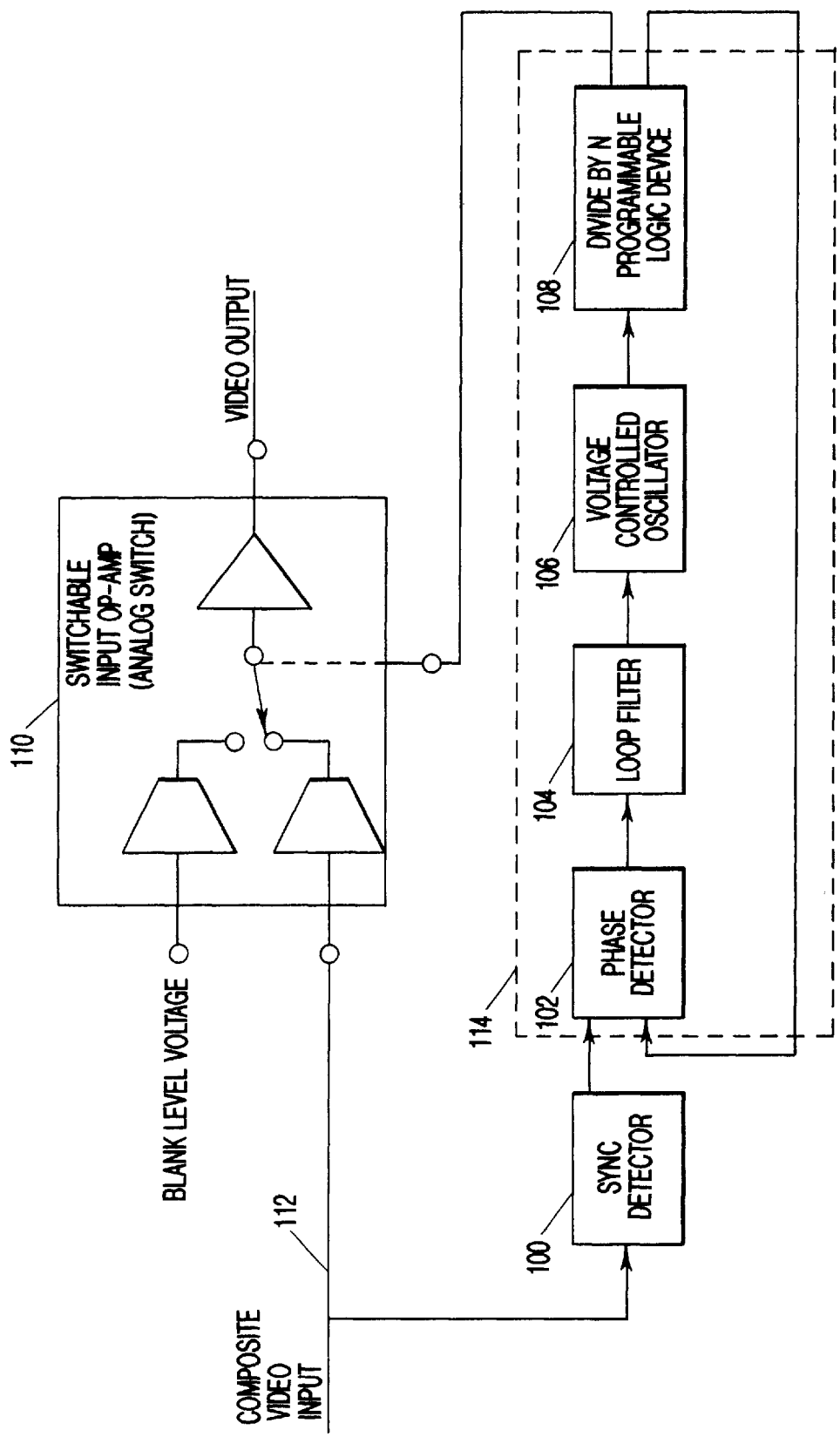
FIG. 1 schematically illustrates the preferred embodiment of the invention.

FIG. 1 illustrates the preferred embodiment of the present invention. Composite video input 112 is sent to sync detector 100, such as a voltage comparator, or the like, which are commonly known in the art. The output of sync detector 100 is then input to phase-locked loop (PLL) 114.

PLL 114 consists of phase detector 102 which compares the phase between the detected sync and the sync generated by the loop 114. Phase detector 102 generates an error which is proportional to the phase difference of the detected sync and the generated sync.

Loop filter 104 is a low pass filter which converts the error from the phase detector 102 into a voltage which drives voltage controlled oscillator 106.

Voltage controlled oscillator 106 generates a high frequency clock signal that is synchronous with the detected sync.

The high frequency clock is then divided down by a programmable logic apparatus 108 which creates a signal with a frequency and phase similar to the detected sync. This signal is feedback to phase detector 102 to complete the PLL 114.

In the preferred embodiment, the PLL 114 is configured to "lock on" the leading edge of the sync signal; however, an alternative embodiment can be configured to "lock on" to the trailing edge.

Figure 3:
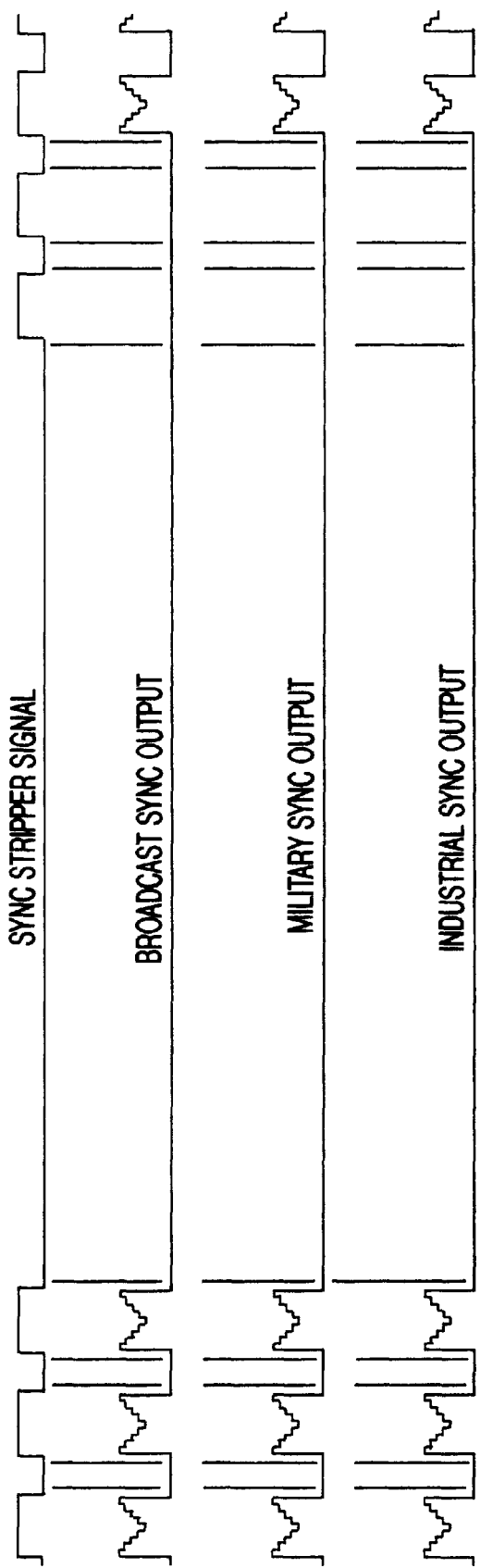
FIG. 3 illustrates the signals of FIG. 2 after implementation of the preferred embodiment.

The programmable logic apparatus 108, such as an ALTERA 5032 (manufactured by ALTERA), generates a signal that starts before the leading edge of the composite sync and lasts longer than the trailing edge of the composite sync, as shown in FIGS. 2 and 3. This is accomplished by counting the number of clock oscillations from the first leading edge of the sync signal to the trailing edge. In an alternative embodiment, the number of clock oscillations are counted from the first trailing edge of the sync signal to the next trailing edge. In selecting the time periods, or, inversely, a clock frequency, the time periods must be longer than $$\frac{1}{\text{frequency}}.$$

The time periods before the leading edge and after the trailing edge can be varied by the programmable logic apparatus 108 by varying the number of clock oscillations before the leading edge of the sync signal, and the number of clock oscillations to end the generated signal. This signal is sent to the switchable input operational amplifier (op-amp) 110, such as a BURR-BROWN OPA 676 (manufactured by BURR-BROWN) (or an analog switch), which switches in a blank level voltage or other selected voltage, rather than allowing the sync signal to pass.

In determining the time period generated by the programmable logic apparatus, the switching time of the switchable input op-amp 110 must be taken into consideration as well as variations in the sync signal. For example, a standard video sync signal is approximately 4.7 micro seconds long or corresponds to about 47 clock oscillations for a 10 MHz clock. If switchable input op-amp 110 requires 6 nano seconds to switch, the generated signal from the programmable logic apparatus 108 must start 1 clock oscillation before the sync signal leading edge and last at least 5 micro seconds or 50 clock oscillations. Although a switchable input op-amps 110 is disclosed, any other high speed, low glitch switch, which is known in the art can be used.

In yet another alternative embodiment, the PLL 114 detects both the leading edge and the trailing edge of the sync signal with the programmable logic apparatus 108 generating a signal that encompasses the sync by counting clock oscillations as discussed above.

The present invention can also strip either horizontal or vertical sync by programming the programmable logic apparatus 108.

FIG. 2 shows the relationship between the composite video and the sync stripper signal for different types of video sync signals prior to signal conditioning.

FIG. 3 shows the relationships of the same composite video signals after conditioning with the preferred embodiment.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself. The entire disclosures of all references, applications, patents, and publications cited above, and of the corresponding application(s), are hereby incorporated by reference.

The embodiments of the invention in which an exclusive property or right is claimed are defined as follows:

1. A circuit for stripping a synchronizing component from a composite video signal, the circuit comprising:

a phase-locked loop comprising:
   a clock which runs at 10 MHz, phase-locked with a leading edge of a video sync signal, the video sync signal is incorporated into the composite video signal; and
   a signal generating means that outputs a signal which begins one clock oscillation period before the leading edge of the video sync signal is detected and ends approximately 50 clock oscillation periods after a trailing edge of the video sync signal is detected; and
an analog switch comprising a switchable input operational amplifier controlled by said signal for switching the blank level voltage onto the composite video signal.

2. A circuit for stripping a synchronization component from a composite video signal, the circuit comprising:

a phase-locked loop comprising:
   a 10 MHZ clock phase-locked with a leading edge of a video sync signal; and
   a signal generating means that outputs a signal that encompasses the video sync signal, said signal begins one clock oscillation period before the leading edge of the video sync and ends approximately 50 clock oscillation thereafter; and
an analog switch comprising a switchable input operational amplifier controlled by said signal for switching a blank level voltage onto the composite video signal.

* * * * *